March 12, 1957 M. CAMRAS 2,785,232

ELECTROMAGNETIC HEAD

Filed Oct. 2, 1951

Inventor
Marvin Camras
by Hill, Sherman, Meroni, Gross & Simpson Attys

United States Patent Office 2,785,232

Patented Mar. 12, 1957

2,785,232

ELECTROMAGNETIC HEAD

Marvin Camras, Chicago, Ill., assignor to Armour Research Foundation of Illinois Institute of Technology, Chicago, Ill., a corporation of Illinois Application October 2, 1951, Serial No. 249,348

13 Claims. (Cl. 179—100.2)

The present invention is concerned with an electromagnetic head structure for use in conjunction with magnetic recording apparatus. The present invention is particularly concerned with dual type magnetic heads which include both a recording and reproducing gap as well as an erase gap for erasing intelligence previously recorded on a traveling magnetic impulse record member.

One of the drawbacks in producing an economical magnetic recording and reproducing assembly is the cost of the electromagnetic head contained therein. Such heads must necessarily be built with precision, as they include non-magnetic gaps of very small dimensions, which must be met within close tolerances. Careful and extensive machining of core structures to provide these critical non-magnetic gaps is therefore a costly and time consuming operation. In addition, the assembly of the magnetic core structure of the size commonly employed for magnetic recording purposes into a suitable housing is also a delicate operation involving a considerable degree of skill.

With the foregoing in mind, an object of the present invention is to provide an improved electromagnetic head assembly for magnetic recording purposes, the head being composed of economical materials.

Still another object of the present invention is to provide an improved electromagnetic head assembly characterized by ease of assembly and capable of being produced economically and rapidly in large scale quantities.

Another object of the present invention is to provide a magnetic head structure which may be assembled from punch press stamped core pieces and a die cast or molded case, with little or no machining or expensive hand operation being required.

Another object of the present invention is to provide a head assembly for multi-channel recording tapes which can be tilted to adjust the perpendicularity between the tape and the non-magnetic gap without causing misalignment of the record and erase sections of the head.

Still another object of the present invention is to provide a head in which there is a shorter lag between the erase and the record functions.

The novel features which I believe to be characteristic of my invention are set forth with particularity in the appended claims. My invention itself, however, both as to its organization, manner of construction and method of operation, together with further objects and advantages thereof, may best be understood by reference to the following description taken in connection with the accompanying drawings, in which:

As shown on the drawings.

Figure 1:
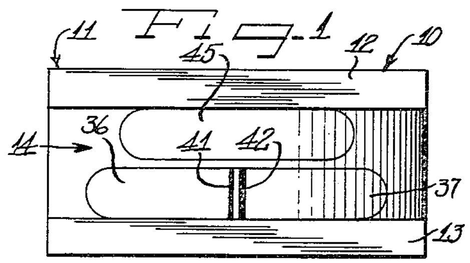
Figure 1 is a plan view of an electromagnetic head embodying the principles of the present invention.

In Figure 1, reference numeral 10 indicates generally an improved electromagnetic head for magnetic recording purposes, including a non-magnetic housing 11 which may be composed of materials such as aluminum or an infusible resin. The housing 11 includes two upstanding wall portions 12 and 13, the wall portions 12 and 13 defining between them a magnetic record receiving channel 14.

The interior of the housing 11 is substantially hollow to receive the magnetic core structure, and contains a pair of integral, spaced supporting members 15 and 16. One of the features of the present invention is the fact that the housing 11, together with the spaced supporting members 15 and 16 can be produced as a simple die casting of a non-magnetic material such as aluminum, or a synthetic resin such as, for example, a phenol-formaldehyde resinous condensation product.

Figure 2:
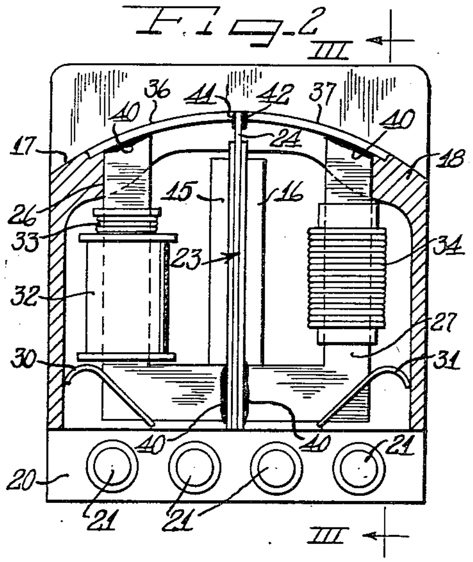
Figure 2 is a view in elevation partly in cross section, illustrating the internal structure of the electromagnetic head.

As best indicated in Figure 2, the housing 11 may be provided with arcuate record guiding portions 17 and 18 at the end of the record receiving channel 14 to guide a traveling magnetic record impulse member over the recording and erase gaps presently to be described.

Also carried by the housing 11 is a terminal block 20 composed of electrical insulating material, the terminal strip 20 being provided with a plurality of lugs or terminals 21 to which the lead-in wires from the various coils associated with the electromagnetic head structure may be soldered or otherwise secured.

Figure 3:
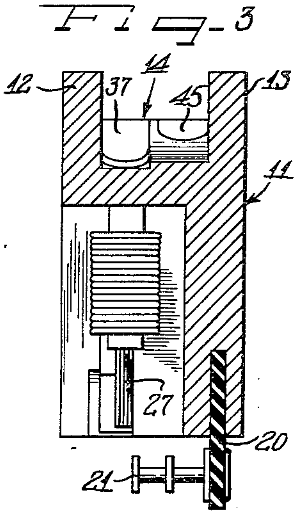
Figure 3 is a cross-sectional view taken substantially along the line III—III of Fig. 2.

The ferromagnetic core structure included within the housing 11 is best shown in Figures 2 and 3 of the drawings. As seen in these two figures, the magnetic core structure consists of a three-legged core, including a center leg 23 composed of a plurality of laminae of ferromagnetic material, including a center lamination 24 which extends into the record receiving channel 14 of the housing 11 and is flush with that channel to provide a smoothly contoured record receiving surface. The laminations making up the center leg 23 are held in position within the interior of the housing 11 by the spaced supporting members 15 and 16.

Figure 5:
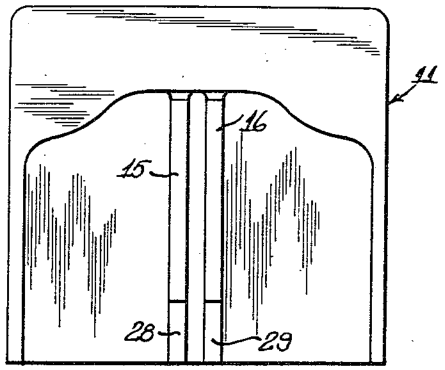
Figure 5 is a view in elevation of the housing with the core elements removed.

The outer legs of the magnetic core structure may each consists of a plurality of L-shaped laminations disposed in confronting relation to the center leg 23. The complete magnetic core structure includes a first L-shaped laminated outer leg 26 and a second outer laminated leg 27. As evident from Figures 2 and 5, the lower, inner edges of the L-shaped outer legs 26 and 27 are adhesively secured by means of adhesive 40 to the center leg 23 in offset portions 28 and 29 provided in the spaced supporting members 15 and 16. The adhesive to be employed may be a suspension of ferromagnetic particles such as "Permalloy" particles in an adhesive resinous composition, and is preferably applied outside the abutting surfaces.

The housing 11 also includes a pair of spaced spring members 30 and 31 each having one end bottomed against the walls of the housing 11 and having slot therein to receive the edge portions of the oppositely disposed outer legs 26 and 27.

The first outer leg 26 carries a pair of coils 32 and 33 for supplying a fluctuating magnetic field in the non-magnetic gap used for recording and reproducing purposes. As is well known to those skilled in the art, the coil 32 is a voice coil energized during operation of the unit as a recording unit by the output of an audio amplifier, while the coil 33 is a bias coil which, during operation as a recording unit, is energized by a source of relatively high frequency electrical energy from a suitable oscillator.

The opposite leg, leg 27 of the magnetic core structure, has a coil 34 disposed thereon, the coil 34 being energized from a suitable high frequency source to provide an erasing field in the vicinity of the erasing gap of the core structure.

Figure 4:
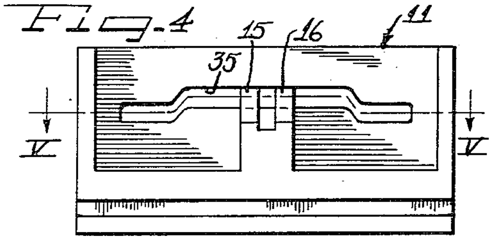
Figure 4 is a bottom plan view of the housing for the electromagnetic head, with the core structure removed.

As best indicated in Figure 4, the housing 11 is provided with elongated slots 35 to receive the uppermost vertical ends of the outer legs 26 and 27 in close fitting relationship. Where a metallic or other electrically conductive housing is employed, the slots 35 should be relatively wide, to provide an open circuit and prevent a short circuited loop across the magnetic flux path. When a non-electrically conductive casing is used, the slots need be no larger than required to pass the core pieces.

Secured to the outer legs 26 and 27, and completing the magnetic circuit of the three legged core are a pair of arcuate record engaging members 36 and 37, these members being suitably curved to provide a smooth path, taken in conjunction with the record engaging surfaces 17 and 18 of housing 11, for the traveling magnetic impulse record member. As indicated best in Figure 2, the record engaging members 36 and 37 are received within suitably recessed areas provided in the record engaging surfaces 17 and 18. The record engaging members 36 and 37 may be adhesively secured to the extreme ends of the outer leg members 26 and 27 by layers of adhesive 40 such as a suspension of "Permalloy" particles in an adhesive resinous binder.

The record engaging members 36 and 37 are separated from the center lamination 24 of center leg 23 to provide a pair of non-magnetic gaps over which the traveling magnetic record member passes during operation. These non-magnetic gaps are formed by providing a relatively thin spacer 41 of copper, solder, or other non-magnetic material at the recording side of the core structure between the center lamination 24 and the outer leg 26, and by providing a relatively wide non-magnetic spacer 42 on the erase side of the core structure, between the center lamination 24 and the outer leg 27. For purposes of illustration, the width of the spacer 41 in the recording and reproducing gap may be on the order of .0003 inch, while the erase gap spacer 42 may be on the order of .003 inch in width.

In order to prevent recording, erasing, or pickup on an adjacent record track when the head is used with a multi-channel record member, the magnetic head of the present invention may also be provided with a keeper 45 of a high permeability material such as "Mu" metal in side-by-side relationship with the magnetic record engaging members 36 and 37. As indicated in Figures 1 and 3, the housing 11 may be suitably recessed to accommodate the curved keeper 45 in proximity to the magnetic record engaging members 36 and 37.

The assembly of the electromagnetic heads of the type shown in Figures 1–5, inclusive, is far simpler because of the unique structure involved, than ordinary electromagnetic transducer heads. In the assembly of the unit, the housing, which may be a one-piece die casting of non-magnetic material, is held in position, and the laminations making up the center leg 23 may then be inserted between the spaced supporting members 15 and 16. The record engaging members 36 and 37, together with spacers 41 and 42 are then inserted, and held in place with a thermosetting cement or by providing a dovetail fit between the record engaging members and the housing. After this initial assembly, the efficiency of the gaps provided by the spacers may be tested and those which operate satisfactorily may be completely assembled by the addition of the outer legs 26 and 27 and their associated coils. The lead-in wires from the coils 32, 33 and 34 can then be secured to the appropriate terminals 21 on the terminal board 20.

Figure 6:
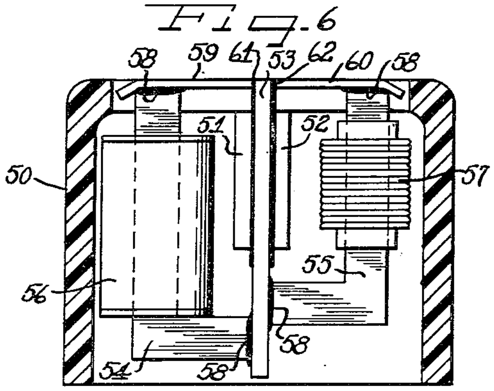
Figure 6 is a cross-sectional view in elevation of a modified form of an electromagnetic head embodying principles of the present invention.

The modified form of the invention illustrated in Figure 6 is in many respects very similar to that previously described in connection with Figures 1–5, inclusive. In the modified form of the invention, the housing 50 is composed of a non-magnetic resinous composition such as a "Bakelite" resin. The head structure shown in Figure 6 was designed for those types of magnetic recording assemblies which utilize substantially flat faced heads, rather than the arcuately shaped record receiving channels employed in the construction of Figures 1 to 5.

The housing 50 includes a pair of spaced supporting members 51 and 52 which support a center leg 53 of the magnetic core structure. In the embodiment illustrated in Figure 6, the center leg 53 is composed of a single lamination, while the outer legs 54 and 55 may be composed of a plurality of laminations of ferromagnetic material. For purposes of illustration, the center leg may be ¾" long, 0.100" wide, and 0.015" thick, so that the non-magnetic gaps are separated by a distance of only about 0.015 inch. The outer L-shaped leg 54 includes a voice coil 56, while the other leg 55 carries an erase coil 57. No bias coil is included, the bias being obtained by magnetic coupling from the erase coil. If desired, as illustrated in Figure 6, the L-shaped leg 55 carrying the erase coil 57 may be made somewhat shorter than the L-shaped leg 54 carrying the voice coil to provide a shorter magnetic flux path for the erasing flux. The outer legs 54 and 55 of the core structure may be adhesively secured to the center leg 53 by a layer 58 of a suitable adhesive composition.

Record engaging members 59 and 60 are designed along the top surface of the housing 50 and are adhesively secured to the outer legs 54 and 55, respectively. Bending the ends of the members 59 and 60 as shown has been found to give beneficial results.

The non-magnetic gaps for the magnetic head are provided by including a relatively thin shim or spacer 61 between the record engaging member 59 and the center leg 50, and a relatively wider shim or spacer 62 between center leg 53 and the other record engaging member 60. In this modified form of the invention, the spacers are shown extending all the way through the supporting members 51 and 52 to hold the center leg in wedged engagement between the supporting members 51 and 52.

It will be appreciated that the heads of the present invention are considerably easier to assemble than conventional recording and erasing heads. All of the components, for example, may be made of simple stampings requiring no extensive machining or painstaking assembly procedures.

The heads of the present invention also have improved electrical performance characteristics, particularly since the spacing between the erase gap and the record gap is reduced, the spacing being less than the width of the head. The net result is that the improved electromagnetic heads of the present invention can be produced far more economically and far more rapidly from readily available materials than can conventional electromagnetic heads.

It will be understood that modifications and variations may be effected without departing from the scope of the novel concepts of the present invention.

I claim as my invention:

1. An electromagnetic head assembly comprising a non-magnetic housing having a curved magnetic record engaging surface formed thereon, spaced support elements in said housing, a magnetic core having a plurality of spaced legs formed of separate pieces of magnetic material including a center leg held in position within said housing between said support elements, said center leg terminating substantially flush with said record engaging surface of said housing, a pair of outer legs bonded to said center leg, a pair of separate curved record-engaging members supported on said housing and forming with said record engaging surface of said housing a smooth record travel surface for a magnetic impulse record member, said curved members being bonded to said outer legs respectively, and a pair of non-magnetic spacers on opposite sides of said center leg defining a pair of non-magnetic gaps between said center leg and said record-engaging member.

2. An electromagnetic head assembly comprising a non-magnetic housing having a magnetic record engaging surface thereon, spaced support elements within said housing, a magnetic core structure formed of a plurality of separate pieces of magnetic material including a center leg supported between said supporting elements and terminating substantially flush with said record engaging surface of said housing, a pair of L-shaped outer legs secured at edge portions thereof to opposite sides of said center leg, a pair of record engaging members carried by said housing, said record engaging members defining with said record engaging surface a smooth record travel path, a relatively narrow non-magnetic spacer disposed on one side of said center leg between said center leg and one of said record engaging members, and a relatively wider non-magnetic spacer on the opposite side of said center leg between said center leg and the other of said record engaging members, said spacers defining non-magnetic gaps in said record travel path.

3. An electromagnetic head assembly comprising a non-magnetic housing having a magnetic record engaging surface thereon, spaced support elements within said housing, a magnetic core structure formed of a plurality of separate pieces of magnetic material including a center leg supported between said supporting elements and terminating substantially flush with said record engaging surface of said housing, a pair of L-shaped outer legs adhesively secured at edge portions thereof to opposite sides of said center leg, a pair of record engaging members carried by said housing and adhesively secured to said outer legs, said record engaging members defining with said record engaging surface a smooth record travel path, a relatively narrow non-magnetic spacer disposed on one side of said center leg between said center leg and one of said record engaging members, and a relatively wider non-magnetic spacer on the opposite side of said center leg between said center leg and the other of said record engaging members, said spacers defining non-magnetic gaps in said record travel path.

4. An electromagnetic head assembly comprising a non-magnetic housing having a magnetic record engaging surface thereon, spaced support elements within said housing, a laminated magnetic core structure including a straight laminated center leg supported between said supporting elements and having at least one of its laminae terminating substantially flush with said record engaging surface of said housing, a pair of L-shaped outer legs secured at edge portions thereof to opposite sides of said center leg, a pair of record engaging members carried by said housing and secured to said outer legs, said record engaging members defining with said record engaging surface a smooth record travel path, and a relatively narrow non-magnetic spacer disposed on one side of said center leg between said center leg and one of said record engaging members, and a relatively wider non-magnetic spacer on the opposite side of said center leg between said center leg and the other of said record engaging members, said spacers defining non-magnetic gaps in said record travel path.

5. An electromagnetic head assembly comprising a non-magnetic housing having a magnetic record engaging surface thereon, spaced support elements within said housing, a laminated magnetic core structure including a straight laminated center leg supported between said supporting elements and having at least one of its laminae terminating substantially flush with said record engaging surface of said housing, a pair of L-shaped outer legs adhesively secured at the respective ends of their lower edge portions thereof to opposite sides of said center leg, a pair of record engaging members carried by said housing and adhesively secured to the upper ends of said outer legs, said record engaging members defining with said record engaging surface a smooth record travel path, a relatively narrow non-magnetic spacer disposed on one side of said center leg between said center leg and one of said record engaging members, and a relatively wider non-magnetic spacer on the opposite side of said center leg between said center leg and the other of said record engaging members, said spacers defining non-magnetic gaps in said record travel path.

6. An electromagnetic head assembly comprising a non-magnetic housing having a magnetic record engaging surface thereon, spaced support elements within said housing, a magnetic core structure including a center leg supported between said supporting elements and terminating substantially flush with said record engaging surface of said housing, a pair of L-shaped outer legs secured at one end of each leg to opposite sides respectively of said center leg, a pair of record engaging members carried by said housing and secured to said outer legs, said record engaging members defining with said record engaging surface a smooth record travel path, a magnetic keeper of relatively high permeability material on said record engaging surface adjacent said record engaging members, a relatively narrow non-magnetic spacer disposed on one side of said center leg between said center leg and one of said record engaging members, and a relatively wider non-magnetic spacer on the opposite side of said center leg between said center leg and the other of said record engaging members, said spacers defining non-magnetic gaps in said record travel path.

7. An electromagnetic head assembly comprising a non-magnetic housing having a magnetic record engaging surface thereon, spaced support elements within said housing, a magnetic core structure including a center leg supported between said supporting elements and terminating substantially flush with said record engaging surface of said housing, a pair of L-shaped outer legs secured at edge portions thereof to opposite sides of said center leg, resilient means bottomed against said housing and supporting said L-shaped legs at their respective corners in said housing, a pair of record engaging members carried by said housing and secured to said outer legs, said record engaging members defining with said record engaging surface a smooth record travel path, a relatively narrow non-magnetic spacer disposed on one side of said center leg between said center leg and one of said record engaging members, and a relatively wider non-magnetic spacer on the opposite side of said center leg between said center leg and the other of said record engaging members, said spacers defining non-magnetic gaps in said record travel path.

8. An electromagnetic head assembly comprising a non-magnetic housing having a magnetic record engaging surface formed thereon, spaced support elements in said housing, a magnetic core having a plurality of spaced legs formed of separate pieces of magnetic material including a center leg held in position within said housing between said support elements, said center leg terminating substantially flush with said record-engaging surface of said housing, a pair of outer legs in magnetic circuit relation with said center leg, a pair of separate record-engaging members supported on said housing and forming with said record-engaging surface of said housing a smooth record travel surface for a magnetic impulse record member, said members being bonded to said outer legs respectively, and a pair of non-magnetic spacers on opposite sides of said center leg defining a pair of non-magnetic gaps between said center leg and said record-engaging members.

9. A head assembly comprising a magnetic core having outer legs of magnetic material and a center leg formed of a separate piece of magnetic material from said outer legs and bonded to and connected in magnetic circuit relation with said outer legs intermediate said outer legs, and a pair of separate gap defining members bonded and magnetically connected to said outer legs respectively and extending toward opposite sides of said center leg and terminating in closely spaced relation to said center leg to define gaps therewith on the respective opposite sides of said center leg for coupling of the core to a magnetic record member, said gap defining members being secured to said center leg to form a unitary sub-assembly adapted to be formed and tested prior to assembly thereof with said outer legs.

10. A head assembly comprising a magnetic core having outer legs and a straight upstanding center leg formed of a separate piece of magnetic material from said outer legs, one end of each outer leg being bonded to and connected in relatively low reluctance magnetic circuit relation with the lower end of said center leg and the other end of each outer leg being relatively more remote from the lower end of said center leg and spaced from the upper end of said center leg, and gap defining members formed of separate pieces of magnetic material from said center leg and said outer legs bonded at one end to the remote ends of the respective outer legs and having their opposite ends disposed in closely spaced relation to respective opposite sides of the upper end of said center leg to define gaps for coupling the core to a magnetic record member, said gap defining members being secured to said center leg to form a unitary sub-assembly adapted to be formed and tested prior to assembly thereof with the outer legs, a mounting for supporting said core, and a support carried by said mounting for engaging the center leg to position said center leg with respect to said mounting.

11. A head assembly comprising a magnetic core having outer legs and a straight upstanding center leg formed of a separate piece of magnetic material from said outer legs, one end of each outer leg being bonded to and connected in relatively low reluctance magnetic circuit relation with the lower end of said center leg and the other end of each outer leg being relatively more remote from the lower end of said center leg and spaced from the upper end of said center leg, and gap defining members formed of separate pieces of magnetic material from said center leg and said outer legs and bonded at one end to the remote ends of the respective outer legs and having their opposite ends disposed in closely spaced relation to respective opposite sides of the upper end of said center leg, said gap defining members being secured to said center leg to form a unitary sub-assembly adapted to be formed and tested prior to assembly thereof with the outer legs, and said outer legs being substantially straight adjacent a free end thereof to receive preformed coils thereon prior to securing of the gap subassembly therewith.

12. A head assembly comprising a magnetic core having outer legs and a straight upstanding center leg formed of a separate piece of magnetic material from said outer legs, one end of each outer leg being bonded to and connected in relatively low reluctance magnetic circuit relation with the lower end of said center leg and the other end of each outer leg being relatively more remote from the lower end of said center leg and spaced from the upper end of said center leg, and gap defining members formed of separate pieces of magnetic material from said center leg and said outer legs and bonded at one end to the remote ends of the respective outer legs and having their opposite sides of the upper end of said center legs, said gap defining members being secured to said center leg to form a unitary sub-assembly adapted to be formed and tested prior to assembly thereof with the outer legs, the center leg and the gap defining members being of strip magnetic material with their respective width dimensions substantially greater than their respective thickness dimensions, the center leg and the gap defining members thus having width dimension surfaces disposed in parallel relation and separated by the thickness dimension of the respective strips, gap defining members having upper width dimension surfaces adjacent a path for a record member successively thereacross, the center leg having an end of each gap defining member terminating adjacent a width dimension surface thereof adjacent the upper end of the center leg so that the gaps on either of the center leg are separated by a distance substantially equal to the thickness dimension of the center leg which is substantially less than the width dimension of the center leg, and the gaps having a width transversely of the path of the record substantially equal to the width dimensions of the gap defining members and substantially greater than the thickness dimensions of the gap defining members.

13. A head assembly comprising a magnetic core comprising outer legs and a straight upstanding center leg formed of a separate piece of magnetic material from said outer legs, one end of each outer leg being bonded to and connected in relatively low reluctance magnetic circuit relation with the lower end of said center leg and the other end of each outer leg being relatively more remote from the lower end of said center leg, and spaced from the upper end of said central leg, and gap defining members formed of separate pieces of magnetic material from said center leg and said outer legs and bonded at one end to the remote ends of the respective outer legs and having their opposite ends disposed in closely spaced relation to respective opposite sides of the upper end of said center leg, said gap defining members being secured to said center leg to form a unitary sub-assembly adapted to be formed and tested prior to assembly thereof with the outer legs, the center leg and the gap defining members being of strip magnetic material with their respective width dimension substantially greater than their respective thickness dimensions, the center leg and the gap defining members thus having width dimension surfaces disposed in parallel relation and separated by the thickness dimension of the respective strips, gap defining members having upper width dimension surfaces adjacent a path for a record member thereacross, the center leg having an end of each gap defining member terminating adjacent a width dimension surface thereof adjacent the upper end of the center leg so that the gaps on either of the center leg are separated by a distance substantially equal to the thickness dimension of the center leg which is substantially less than the width dimension of the center leg, and the gaps having a width substantially equal to the width dimensions of the gap defining members and substantially greater than the thickness dimensions of the gap defining members, the outer legs being formed of strip material of substantially greater width than thickness and having width surfaces in vertical planes generally at right angles to the vertical planes of the center leg width surfaces.

References Cited in the file of this patent

UNITED STATES PATENTS

| | | |
|---|---|---|
| 1,897,040 | Christopher | Feb. 14, 1933 |
| 2,456,767 | Camras | Dec. 12, 1945 |
| 2,513,653 | Kornei | July 4, 1950 |
| 2,565,191 | Zenner | Aug. 21, 1951 |
| 2,655,562 | Clark | Oct. 13, 1953 |

FOREIGN PATENTS

| | | |
|---|---|---|
| 262,323 | Switzerland | Sept. 16, 1949 |
| 617,796 | Germany | Aug. 28, 1935 |